(12) United States Patent
You et al.

(10) Patent No.: US 10,798,696 B2
(45) Date of Patent: Oct. 6, 2020

(54) METHOD AND USER EQUIPMENT FOR RECEIVING DOWNLINK SIGNAL, AND METHOD AND BASE STATION FOR TRANSMITTING DOWNLINK SIGNAL

(71) Applicant: LG ELECTRONICS INC., Seoul (KR)

(72) Inventors: Hyangsun You, Seoul (KR); Yunjung Yi, Seoul (KR); Hanbyul Seo, Seoul (KR); Eunsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/318,117

(22) PCT Filed: Jul. 17, 2017

(86) PCT No.: PCT/KR2017/007667
§ 371 (c)(1),
(2) Date: Jan. 15, 2019

(87) PCT Pub. No.: WO2018/016828
PCT Pub. Date: Jan. 25, 2018

(65) Prior Publication Data
US 2019/0297602 A1 Sep. 26, 2019

Related U.S. Application Data

(60) Provisional application No. 62/363,320, filed on Jul. 17, 2016.

(51) Int. Cl.
*H04W 72/04* (2009.01)
*H04L 1/00* (2006.01)
(Continued)

(52) U.S. Cl.
CPC ........... *H04W 72/042* (2013.01); *H04J 11/00* (2013.01); *H04L 1/0026* (2013.01);
(Continued)

(58) Field of Classification Search
None
See application file for complete search history.

(56) References Cited

U.S. PATENT DOCUMENTS

2012/0263117 A1* 10/2012 Love ............... H04L 5/0091
370/329
2013/0114496 A1* 5/2013 Mazzarese ........... H04L 5/0023
370/312
(Continued)

FOREIGN PATENT DOCUMENTS

WO 2012045200 4/2012

OTHER PUBLICATIONS

PCT International Application No. PCT/KR2017/007667, Written Opinion of the International Searching Authority dated Oct. 30, 2017, 18 pages.

(Continued)

*Primary Examiner* — Yaotang Wang
(74) *Attorney, Agent, or Firm* — Lee Hong Degerman Kang Waimey

(57) ABSTRACT

According to the present invention, a base station transmits zero-power information with respect to a downlink control channel, sets some of downlink control channel candidates in a slot at zero-power in accordance with the zero-power information, and transmits the downlink control channel via the downlink control channel candidates User equipment receives the zero-power information with respect to the downlink control channel and receives the downlink control channel via the downlink control channel candidates in the slot. The user equipment detects the downlink control chan-
(Continued)

nel by assuming, on the basis of the zero-power information, that the some of downlink control channel candidates are zero-power.

6 Claims, 10 Drawing Sheets

(51) Int. Cl.
    *H04L 5/00*           (2006.01)
    *H04W 24/10*        (2009.01)
    *H04W 72/12*        (2009.01)
    *H04J 11/00*         (2006.01)

(52) U.S. Cl.
    CPC ........... *H04L 5/0053* (2013.01); *H04W 24/10* (2013.01); *H04W 72/12* (2013.01); *H04W 72/1289* (2013.01)

(56) References Cited

U.S. PATENT DOCUMENTS

2014/0073336 A1    3/2014   Kang
2014/0204836 A1    7/2014   Johansson et al.

OTHER PUBLICATIONS

Ericsson, "On Power Spectral Density Regulations for eLAA Transmissions", 3GPP TSG RAN WG1 Meeting #85, R1-165145, May 2016, 2 pages.

\* cited by examiner

METHOD AND USER EQUIPMENT FOR RECEIVING DOWNLINK SIGNAL, AND METHOD AND BASE STATION FOR TRANSMITTING DOWNLINK SIGNAL

CROSS-REFERENCE TO RELATED APPLICATIONS

This application is the National Stage filing under 35 U.S.C. 371 of International Application No. PCT/KR2017/007667, filed on Jul. 17, 2017, which claims the benefit of U.S. Provisional Application No. 62/363,320, filed on Jul. 17, 2016, the contents of which are all hereby incorporated by reference herein in their entirety.

TECHNICAL FIELD

The present invention relates to a wireless communication system, and more particularly, to methods and devices for receiving/transmitting downlink signals.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services at any time and anywhere by connecting a plurality of devices and objects to each other is one main issue to be considered in next generation communication.

Further, a communication system to be designed in consideration of a service/UE sensitive to reliability and standby time is under discussion. Introduction of next generation radio access technology has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a signal transmission/reception method is required in the system supporting new radio access technologies.

The technical objects that can be achieved through the present invention are not limited to what has been particularly described hereinabove and other technical objects not described herein will be more clearly understood by persons skilled in the art from the following detailed description.

Technical Solution

According to an aspect of the present invention, provided herein is a method of receiving a downlink (DL) signal by a user equipment in a wireless communication system. The method includes: receiving zero-power information on a DL control channel; and receiving the DL control channel among DL control channel candidates in a slot. The user equipment may receive the DL control channel by regarding a part of the DL control channel candidates as having zero-power based on the zero-power information.

According to another aspect of the present invention, provided herein is a user equipment for receiving a downlink (DL) signal in a wireless communication system. The user equipment includes a radio frequency (RF) unit, and a processor configured to control the RF unit. The processor is configured to: control the RF unit to receive zero-power information on a DL control channel; and control the RF unit to receive the DL control channel among DL control channel candidates in a slot. The processor may be configured to detect the DL control channel by regarding a part of the DL control channel candidates as having zero-power based on the zero-power information.

According to another aspect of the present invention, provided herein is a method of transmitting a downlink (DL) signal to a user equipment by a base station in a wireless communication system. The method includes: transmitting zero-power information on a DL control channel; and transmitting the DL control channel among DL control channel candidates in a slot. The base station may transmit the DL control channel by setting a part of the DL control channel candidates to have zero-power according to the zero-power information.

According to another aspect of the present invention, provided herein is a base station for transmitting a downlink (DL) signal to a user equipment in a wireless communication system. The base station includes a radio frequency (RF) unit, and a processor configured to control the RF unit. The processor is configured to: control the RF unit to transmit zero-power information on a DL control channel; and control the RF unit to transmit the DL control channel among DL control channel candidates in a slot. The processor may be configured to set a part of the DL control channel candidates to have zero-power according to the zero-power information.

In each aspect of the present invention, the DL control channel candidates may be divided into nonzero-power resources and zero-power resources. The base station may transmit the DL control channel by boosting transmission power of the nonzero-power resources of the DL control channel candidates according to the zero-power information. The user equipment may detect the DL control channel on the nonzero-power resources of the DL control channel candidates based on the zero-power information.

In each aspect of the present invention, the zero-power information may be information indicating a ratio between the amount of the zero-power resources and the amount of the nonzero-power resources among the DL control channel candidates or a ratio between transmission power of the nonzero-power resources when the zero-power resources are not present in the DL control channel candidates and transmission power of the nonzero-power resources when the zero-power resources are present in the DL control channel candidates.

In each aspect of the present invention, the slot may be divided into a control region and a data region in a time domain.

In each aspect of the present invention, first interference measurement resource information indicating a first interference measurement resource in the control region may be provided to the user equipment. The user equipment may acquire first channel state information on the DL control channel using the first interference measurement resource. The base station may receive the first channel state information associated with the first interference measurement resource from the user equipment.

In each aspect of the present invention, second interference measurement resource information indicating a second interference measurement resource in the data region may be provided to the user equipment. The user equipment may acquire second channel state information on a data channel transmitted in the data region using the second interference measurement resource. The base station may receive the second channel state information associated with the second interference measurement resource from the user equipment.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, uplink/downlink signals can be efficiently transmitted/received. Therefore, overall throughput of a radio communication system can be improved.

According to an embodiment of the present invention, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the system supporting new radio access technologies.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

MODE FOR INVENTION

Figure 1:
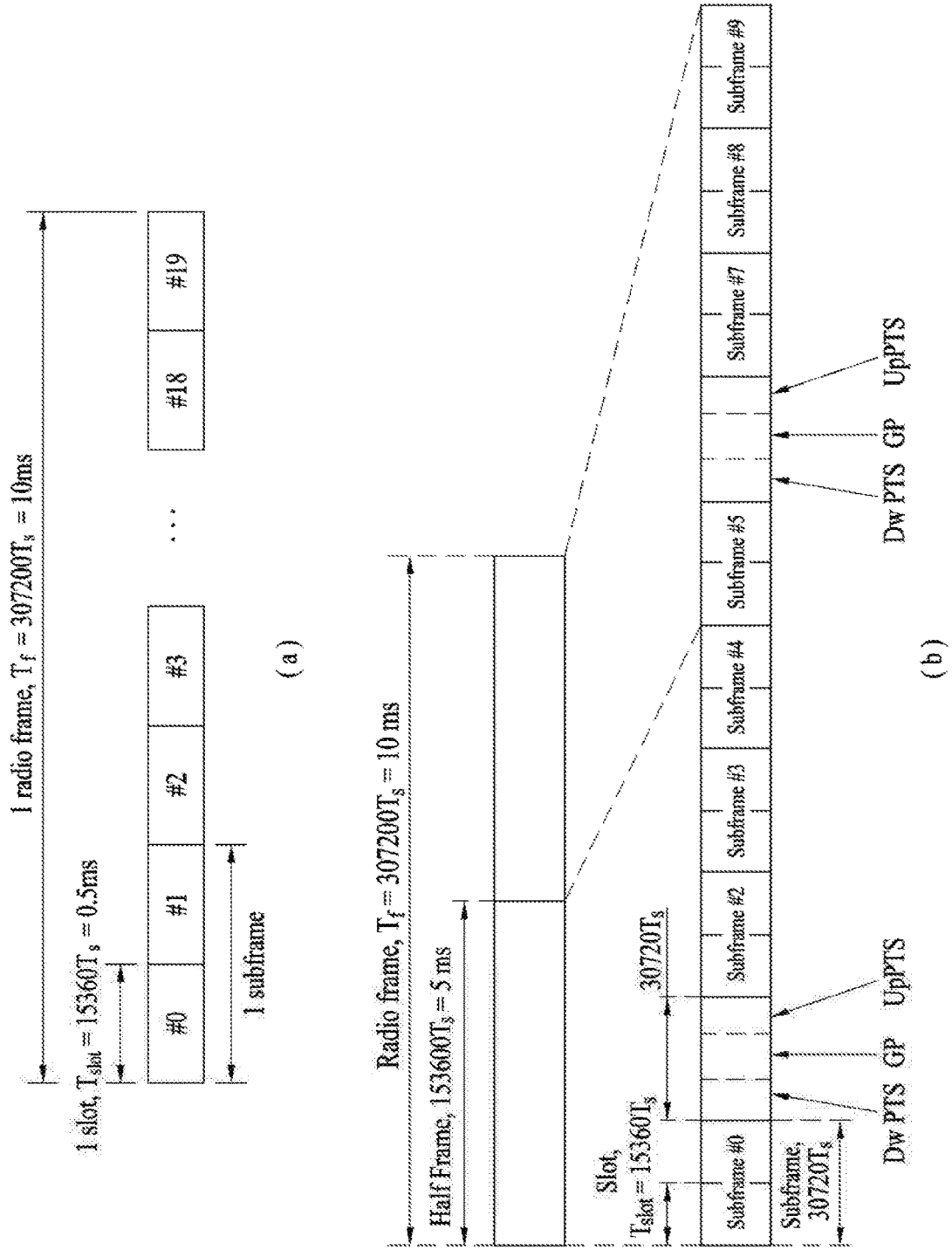
FIG. 1 illustrates the structure of a radio frame used in the LTE/LTE-A based wireless communication system.

Reference will now be made in detail to the examples of the present invention, examples of which are illustrated in the accompanying drawings. The detailed description, which will be given below with reference to the accompanying drawings, is intended to explain examples of the present invention, rather than to show the only examples that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmitting device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmitting devices always sense carrier of a network and, if the network is empty, the transmitting devices wait for determined time according to locations thereof registered in a list and then transmit data. Various methods are used to determine priority of the transmitting devices in the list and to reconfigure priority. In a system according to some versions of IEEE 802.11 standards, collision may occur and, in this case, a collision sensing procedure is performed. A transmitting device using CSMA/CA avoids collision between data transmission thereof and data transmission of another transmitting device using a specific rule.

In examples of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channe.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321 and 3GPP TS 36.331 may be referenced.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms ($307,200T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE-LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Figure 2:
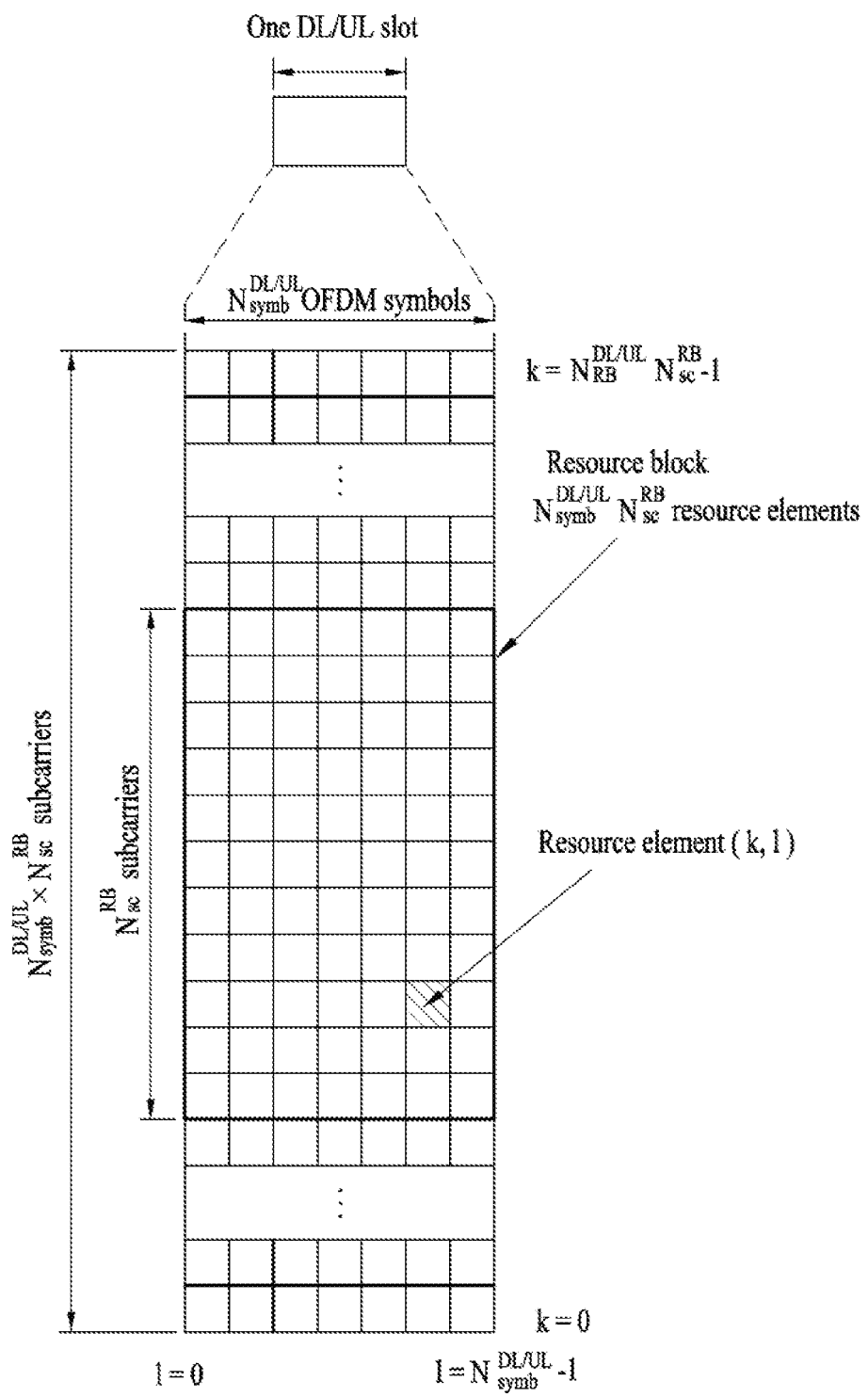
FIG. 2 illustrates the structure of a downlink (DL)/uplink (UL) slot in the LTE/LTE-A based wireless communication system.

FIG. 2 illustrates the structure of a DL/UL slot structure in the LTE/LTE-A based wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{DL}_{RB}$ denotes the number of RBs in a UL slot. $N^{DL}_{RB}$ and $N^{DL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, examples of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

A UE, which has demodulated a DL signal by performing a cell search procedure using PSS/SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB17 according to included parameters.

The MIB includes most frequency transmitted parameters which are essential for initial access of the UE to a network of the eNB. The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

SIB1 includes not only information about time-domain scheduling of other SIBs but also parameters needed to determine whether a specific cell is suitable for cell selection. SIB1 is received by the UE through broadcast signaling or dedicated signaling.

A DL carrier frequency and a system bandwidth (BW) corresponding to the DL carrier frequency may be acquired by the MIB that the PBCH carries. A UL carrier frequency and a system BW corresponding to the UL carrier frequency may be acquired through system information which is a DL signal. If no stored valid system information about a corresponding cell is present as a result of receiving the MIB, the UE applies a DL BW in the MIB to a UL BW until SIB2 is received. For example, the UE may recognize an entire UL system BW which is usable for UL transmission thereby through UL-carrier frequency and UL-BW information in SIB2 by acquiring SIB2.

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, the UE may perform a random access procedure to complete access to the eNB. To this end, the UE may transmit a preamble through a physical random access channel (PRACH) and receive a response message to the preamble through a PDCCH and a PDSCH. In contention based random access, the UE may perform additional PRACH transmission and a contention resolution procedure of a PDCCH and a PDSCH corresponding to the PDCCH.

After performing the aforementioned procedure, the UE may perform PDDCH/PDSCH reception and PUSCH/PUCCH transmission as general uplink/downlink transmission procedures.

Figure 3:
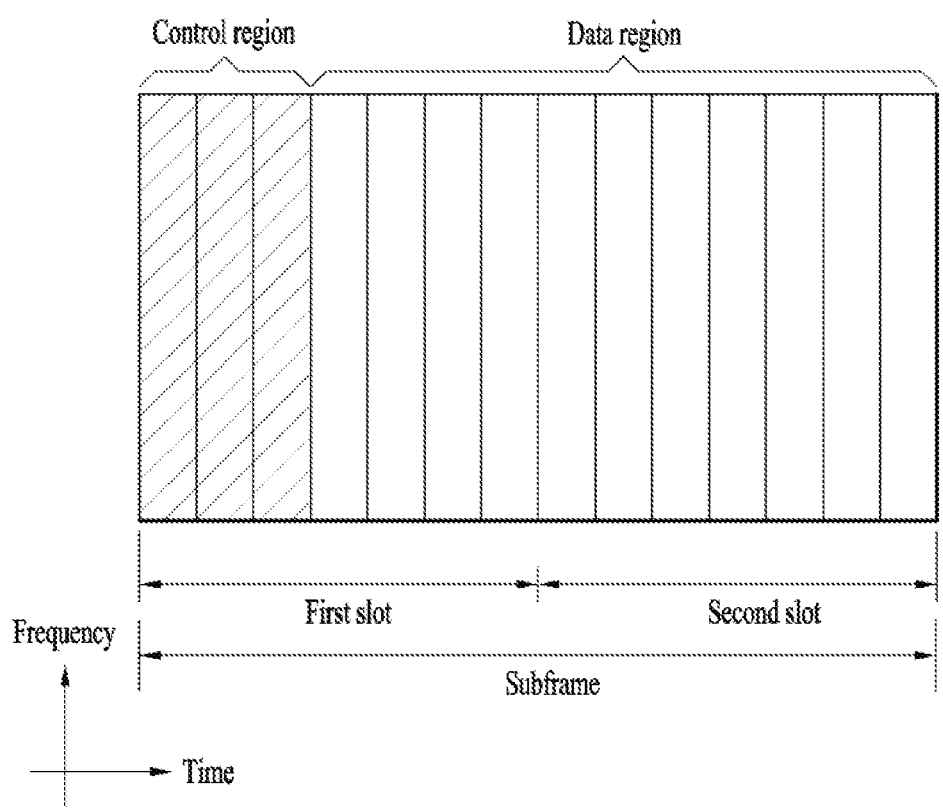
FIG. 3 illustrates the structure of a DL subframe used in the LTE/LTE-A based wireless communication system.

FIG. 3 illustrates the structure of a DL subframe used in the LTE/LTE-A based wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE includes nine REGs, and the nine REGs are distributed over first one/two/three OFDM symbols (or four OFDM symbols if necessary for 1.4 MHz) and over the system bandwidth in order to mitigate interference for the purpose of diversity. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

CCEs available for PDCCH transmission in a system may be numbered from 0 to $N_{CCE}-1$, wherein $N_{CCE}=\text{floor}(N_{REG}/9)$ and $N_{REG}$ denotes the number of REGs which are not allocated to a PCFICH or a PHICH. A PDCCH consisting of n consecutive CCEs may start only on a CCE fulfilling "i mod n=0", wherein i denotes a CCE number.

In a 3GPP LTE/LTE-A system, a set of CCEs on which a PDCCH may be located for each UE is defined. A set of CCEs on which the UE can discover a PDCCH thereof is referred to as a PDCCH search space or simply as a search space. An individual resource on which the PDCCH can be transmitted in the search space is called a PDCCH candidate. A set of PDCCH candidates that the UE is to monitor is defined as a search space. Herein, a search space $S^{(L)}_k$ in an aggregation level $L \in \{1,2,4,8\}$ is defined by a set of candidates of the PDCCH. A search space may have a different size and a dedicated search space and a common search space are defined. The dedicated search space is a UE-specific search space (USS) and is configured for each individual UE. The common search space (CSS) is configured for a plurality of UEs. The following table shows an example of aggregation levels for defining search spaces.

TABLE 1

| Type | Search space $S^{(L)}_k$ Aggregation level L | Size [in CCEs] | Nuber of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The control region of each serving cell consists of a set of CCEs, numbered from 0 to $N_{CCE,k}-1$, where $N_{CCE,k}$ is the total number of CCEs in the control region of subframe k. In a 3GPP LTE/LTE-A system, a set of CCEs on which a PDCCH can be located for each UE is defined. The UE monitors a set of PDCCH candidates on one or more activated serving cells configured as serving cells by higher-layer signaling for control information. Herein, monitoring means that the UE implies attempting to decode each of PDCCHs in a set according to all monitored DCI formats. For each serving cell, on which a PDCCH is monitored, CCEs corresponding to PDCCH candidate m of a search space $S^{(L)}_k$ are given by "$L*\{Y_k+m'\} \bmod \text{floor}(N_{CCE,k}/L)+i$", where, $i=0, \ldots, L-1$. For the common search space, m'=m. For the PDCCH UE specific search space, for the serving cell on which the PDCCH is monitored, if the monitoring UE is configured with carrier indicator field, then $m'=m+M^{(L)}*n_{CI}$ (where, $n_{CI}$ is the carrier indicator field (CIF) value), else if the monitoring UE is not configured with carrier indicator field, then m'=m (where m=0, 1, ..., $M^{(L)}-1$). $M^{(L)}$ is the number of PDCCH candidates to monitor with an aggregation level L in the given search space. The carrier aggregation field value may be equal to a serving cell index ServCellIndex. For the common search spaces, $Y_k$ is set to 0 for the two aggregation levels L=4 and L=8. For the UE-specific search space $S^{(L)}_k$ at an aggregation level L, the variable $Y_k$ is defined by "$Y_k=(A \cdot Y_{k-1}) \bmod D$", where, $Y_{-1}=n_{RNTI} \neq 0$, A=39827, D=65537 and k=floor$(n_s/2)$, and $n_s$ is the slot number within a radio frame.

Figure 4:
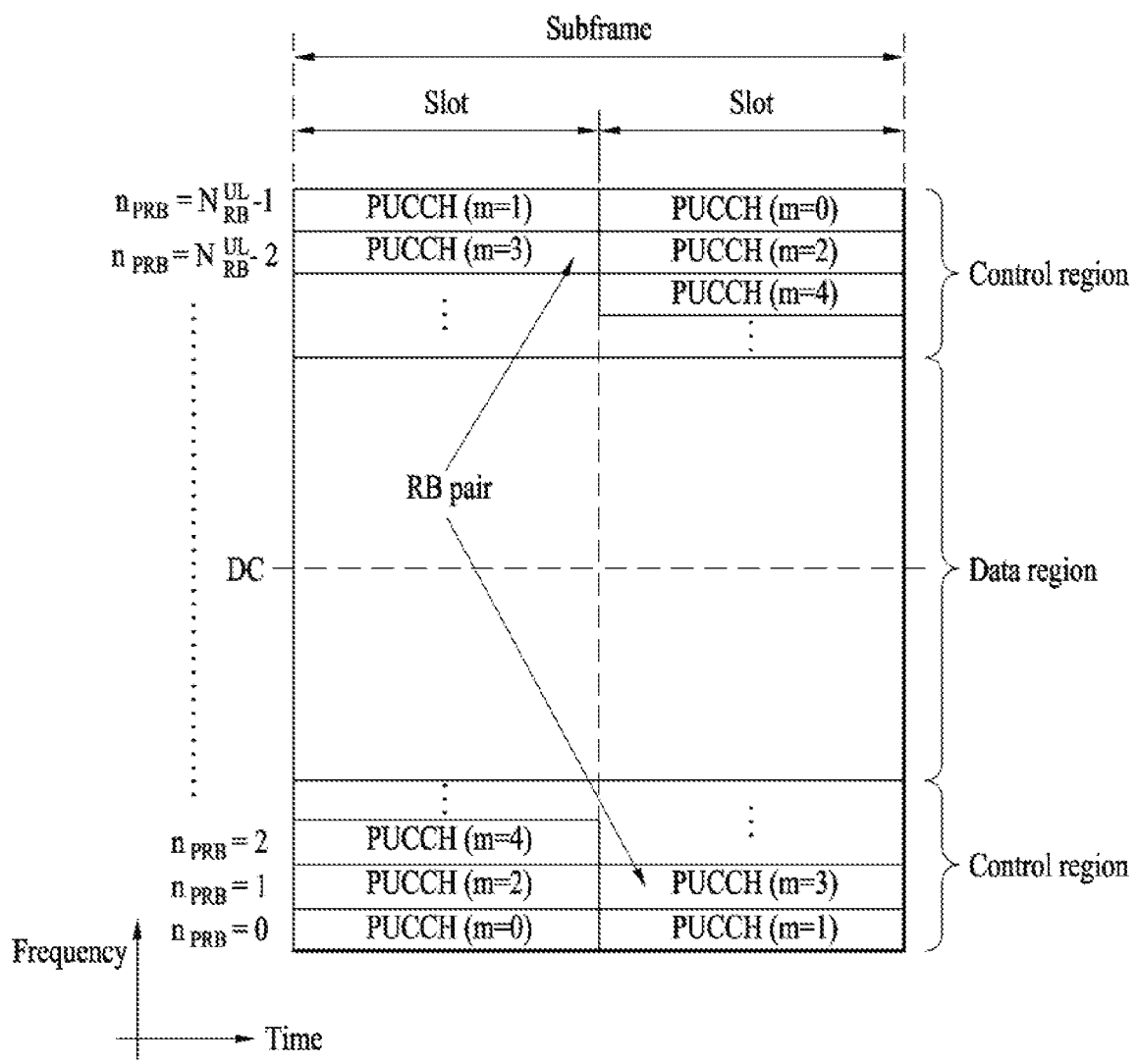
FIG. 4 illustrates the structure of a UL subframe used in the LTE/LTE-A based wireless communication system.

FIG. 4 illustrates the structure of a UL subframe used in the LTE/LTE-A based wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and/or the PDSCH may be transmitted to the MTC UE having the coverage issue through multiple (e.g., about 100) subframes.

The examples of the present invention can be applied to not only the 3GPP LTE/LTE-A system but also a new radio access technology (RAT) system. As a number of communication devices have required much higher communication capacity, the necessity of mobile broadband communication, which is much enhanced compared to the conventional RAT, has increased. In addition, massive MTC capable of providing various services anytime and anywhere by connecting a number of devices or things to each other has been considered as a main issue in the next generation communication system. Moreover, the design of a communication system capable of supporting services/UEs sensitive to reliability and latency has also been discussed. That is, the introduction of the next generation RAT considering the enhanced mobile broadband communication, massive MTC, Ultra-reliable and low latency communication (URLLC), etc. has been discussed. For convenience of description, the corresponding technology is simply referred to as a new RAT in this specification.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

Figure 5:
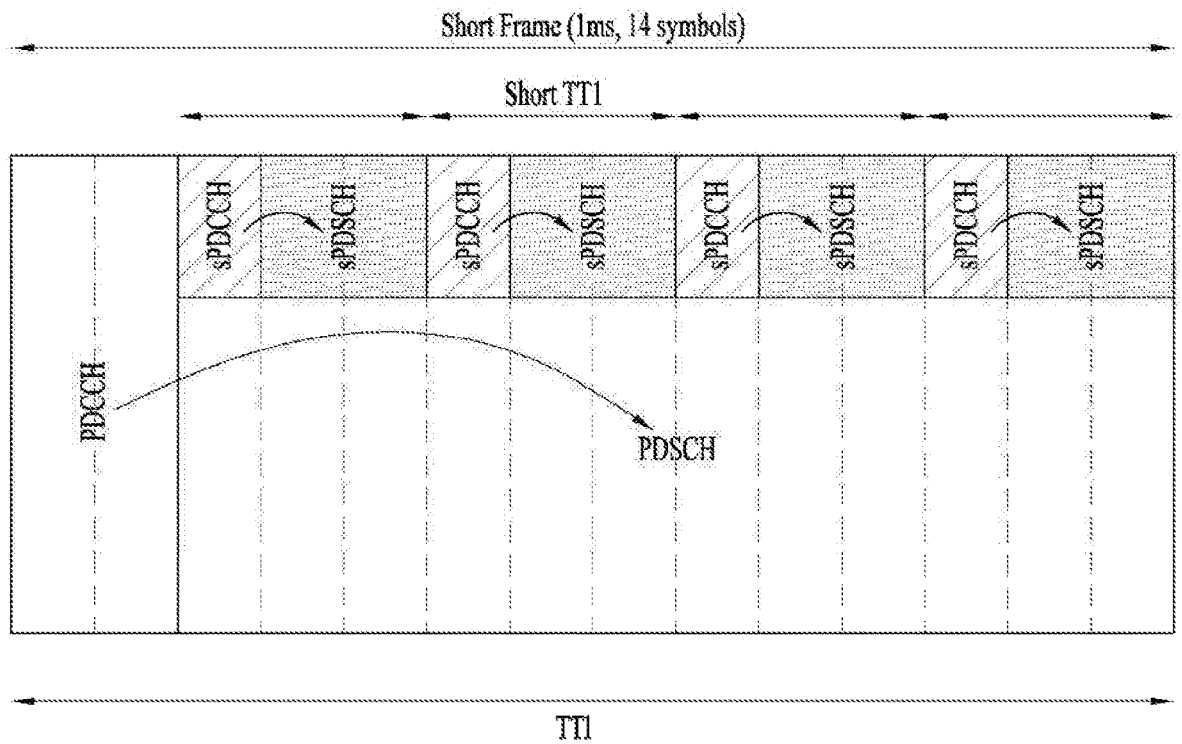
FIG. 5 illustrates an example of a short transmission time interval (TTI) and a transmission example of a control channel and a data channel in the short TTI.

FIG. 5 illustrates an example of a short TTI and a transmission example of a control channel and a data channel in the short TTI.

To reduce a user plane (U-plane) latency to 1 ms, a shortened TTI (sTTI) shorter than 1 ms may be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI.

In the following description, a default TTI or main TTI used in the system is referred to as a TTI or subframe, and the TTI having a shorter length than the default/main TTI of the system is referred to as an sTTI. For example, in a system in which a TTI of 1 ms is used as the default TTI as in the current LTE/LTE-A system, a TTI shorter than 1 ms may be referred to as the sTTI. The method of transmitting/receiving a signal in a TTI and an sTTI according to embodiments described below is applicable not only to the system according to the current LTE/LTE-A numerology but also to the default/main TTI and sTTI of the system according to the numerology for the new RAT environment.

In the downlink environment, a PDCCH for transmission/scheduling of data within an sTTI (i.e., sPDCCH) and a PDSCH transmitted within an sTTI (i.e., sPDSCH) may be transmitted. For example, referring to FIG. 5, a plurality of the sTTIs may be configured within one subframe, using different OFDM symbols. For example, the OFDM symbols in the subframe may be divided into one or more sTTIs in the time domain. OFDM symbols constituting an sTTI may be configured, excluding the leading OFDM symbols on which the legacy control channel is transmitted. Transmission of the sPDCCH and sPDSCH may be performed in a TDM manner within the sTTI, using different OFDM symbol regions. In an sTTI, the sPDCCH and sPDSCH may be transmitted in an FDM manner, using different regions of PRB(s)/frequency resources. [99] In a new RAT (NR) system, a time unit in which a data channel may be scheduled may be referred to as other terms, for example, a slot, instead of a subframe. The number of slots in a radio frame of the same time length may differ according to a time length of a slot. In the present invention, the terms "subframe", "TTI", and "slot" are interchangeably used to indicate a basic time unit of scheduling.

<OFDM Numerology>

The new RAT system uses an OFDM transmission scheme or a similar transmission scheme. For example, the new RAT system may follow the OFDM parameters defined in the following table. Alternatively, the new RAT system may conform to numerologies of legacy LTE/LTE-A but have a broader system bandwidth (e.g., 100 MHz). Alternatively, one cell may support a plurality of numerologies. That is, UEs operating with different numerologies may coexist in one cell.

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of $0.5\lambda$ (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

<Subframe Structure>

Figure 6:
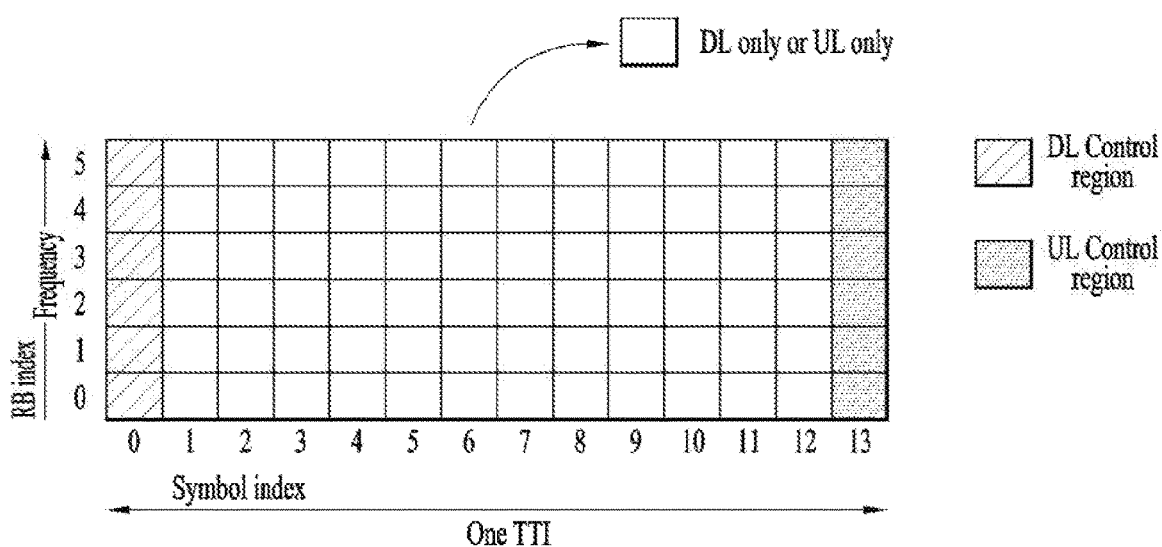
FIG. 6 illustrates a subframe structure.

FIG. 6 illustrates a subframe structure in a new radio access technology (NR).

To minimize data transmission latency, a self-contained subframe structure in which a control channel and a data channel are time-division-multiplexed (TDMed) is considered in 5G new RAT.

In FIG. 6, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 6, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the subframe structure are set as a guard period (GP).

In a legacy LTE/LTE-A system, the DL control channel is TDMed with the data channel (refer to FIG. 3) and the PDCCH, which is the control channel, is distributively transmitted throughout an entire system band. However, in the new RAT, it is expected that the bandwidth of one system reaches approximately a minimum of 100 MHz and it is difficult to distributively transmit the control channel throughout the entire band. For data transmission/reception, if the UE monitors the entire band to receive the DL control channel, this may cause increase in battery consumption of the UE and deterioration in efficiency. Accordingly, the present invention proposes a scheme of locally or distributively transmitting the DL control channel in a partial frequency band within a system band, i.e., within a channel band.

Figure 7:
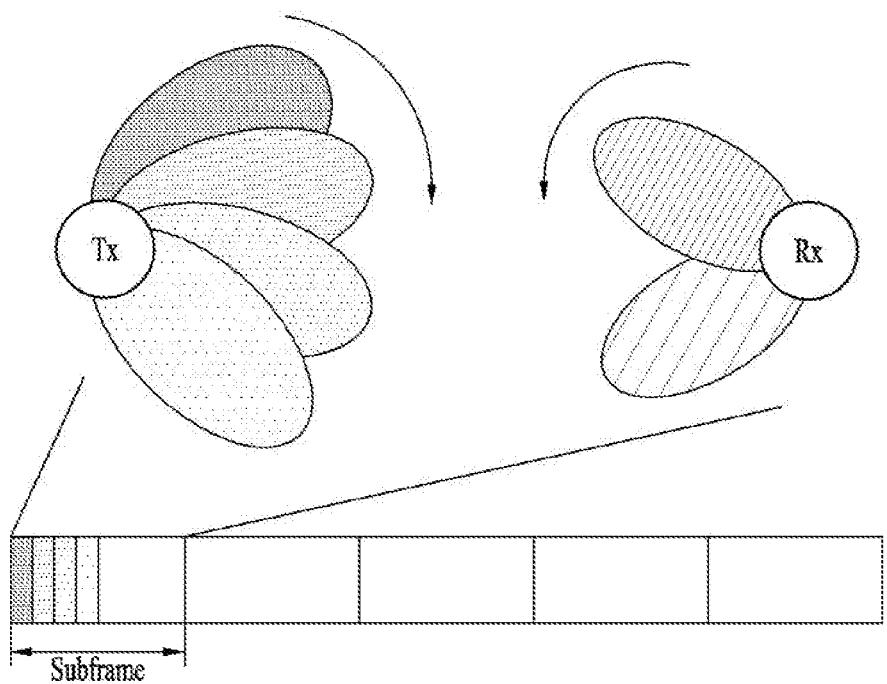
FIG. 7 illustrates an application example of analog beamforming.

FIG. 7 illustrates a transmission/reception method of a radio signal using an analog beam. Particularly, FIG. 7 illustrates a transmission/reception method of a radio signal by transmission/reception (Tx/Rx) analog beam scanning.

Referring to FIG. 7, if the eNB transmits a synchronization signal in a cell or on a carrier while switching beams, the UE performs synchronization with the cell/carrier using the synchronization signal detected in the cell/carrier and searches for a (beam) direction which is most matched therefor. Through this process, the UE should be able to acquire a cell ID and a beam ID (corresponding to the beam direction). While the UE acquires the beam ID, the UE may acquire a signal transmitted in the beam direction, particularly, RS information, for example, an RS sequence, seed information, or a location. The eNB may allocate a group ID to UEs that have acquired a specific beam ID, i.e., UEs capable of receiving a DL channel in a specific beam direction and transmit cell-common information to the UEs by being divided in time/space on a beam ID basis. The cell-common information may be transmitted to the UEs by a beam ID common scheme.

A UE that has acquired a beam ID in the cell receives cell-specific information as beam ID or group ID specific information. The beam ID or group ID specific information may be information that UEs of a corresponding group commonly receive.

In the present invention, a channel on which DL data is transmitted is referred to as a PDSCH and a channel on which UL data is transmitted is referred to as a PUSCH, for convenience of description. In the present invention, although a DL environment (transmission of a PDSCH and/or a PDSCH) is mainly focused on in describing the present invention for convenience of description, the contents of the present invention are also applicable to a UL environment (transmission of a PUCCH and/or a PUSCH).

The present invention proposes power spectral density (PSD) boosting and inter-cell interference coordination (ICIC) schemes for raising the transmission performance and reliability of the PDCCH and the PDSCH in a new RAT (NR) environment. For convenience of description, although transmission of the PDCCH is mainly described by way of example, the contents of the present invention are also applicable to transmission of the PUCCH, the PDSCH, and the PUSCH.

A PDCCH mentioned in the present invention may be a PDCCH transmitted in a UE-specific search space (USS) or a PDCCH transmitted in a group-specific search space (GSS) or a cell-common or cell-specific search space (CSS). In the present invention, an RS for demodulating the PDCCH or an RS of the PDCCH may represent a UE-specifically transmitted RS in the case of the USS, a group-specifically transmitted RS in the case of the GSS, or a cell-specifically transmitted RS in the case of the CSS. Hereinafter, although the USS will mainly be considered in describing the present invention, the contents of the present invention are also applicable to the GSS and the CSS.

<A. PSD Boosting of PDCCH>

Figure 8:
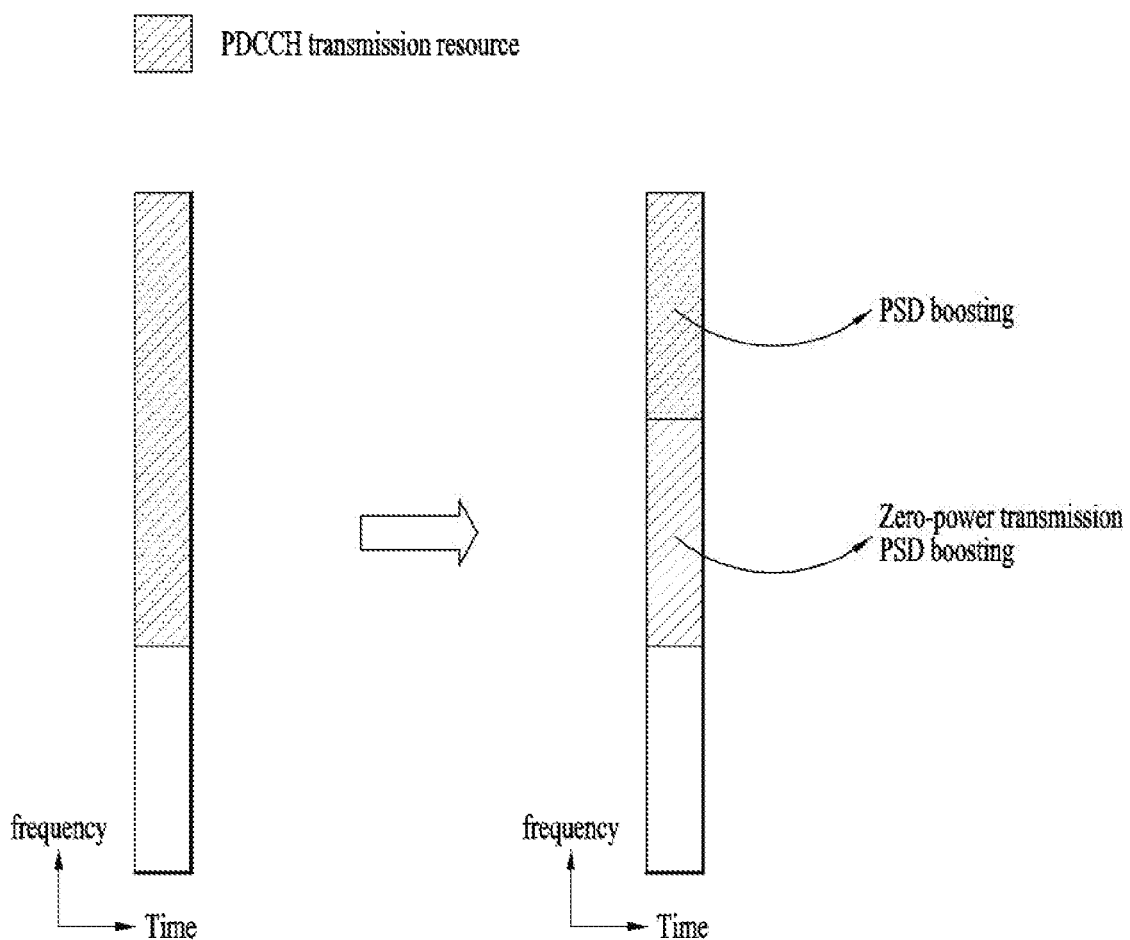
FIG. 8 is an example of performing zero-power transmission on a part of control channel resources according to the present invention.

FIG. 8 illustrates an example of zero-power transmission on a part of a control channel resource according to the present invention.

In a legacy LTE/LTE-A system, the ratio between the power of a CRS RE and the power of a normal RE is predetermined, so that a network or an eNB cannot arbitrarily boost the power of a control channel. The present invention proposes performing PSD boosting to raise the transmission performance and reliability of a PDCCH. The eNB may reduce frequency resources used for transmission of the PDCCH at the same timing (e.g., in a region of the same OFDM symbol(s)) but perform PSD boosting for raising the transmission power of the PDCCH. In this case, as illustrated in FIG. 8, since the area of frequency resources on which the PDCCH is transmitted per time symbol is reduced but the PDCCH is transmitted at higher power, this may be helpful to improve channel estimation performance. For example, as illustrated in FIG. 8, although the eNB reduces a frequency resource region in which the PDCCH is transmitted, the eNB may transmit the PDCCH in the reduced resource region at increased power. In the present invention, the eNB performs zero-power transmission (i.e., muting) in a partial frequency resource region to perform PSD boosting. The present invention proposes performing PSD boosting of the PDCCH by causing the eNB to perform zero-power transmission on a part of PDCCH resources as follows.

In the present invention, a DL channel may not be transmitted on resources on which zero-power transmission is performed. Alternatively, the DL channel such as a PDCCH and/or a PDSCH may not be transmitted on resources on which zero-power transmission is performed but some RSs such as a CRS and/or a CSI-RS (e.g., RSs used for frequency/time tracking or for reference signal received power (RSRP)/reference signal received quality (RSRQ), the CRS, and/or the CSI-RS) may be transmitted on the resources on which zero-power transmission is performed. In addition, in the present invention, some DL signals (e.g., a synchronization signal and a PBCH) on the resources on which zero-power transmission is performed may be transmitted without being muted. According to the present invention, if zero-power transmission is performed on a part of PDCCH resources and an RS is transmitted on the part of the PDCCH resources, interference measurement for a control channel and interference measurement for a data channel may be separately transmitted. This has an advantage of enabling accurate channel demodulation or channel state reporting according to DL channel type or characteristics in a frequency environment in which a channel situation experienced by a control channel is different from a channel situation experienced by a data channel. For example, the eNB may configure an interference measurement resource for a control region in which control channel(s) are transmitted (hereinafter, a control interference measurement resource) and provide information about the control interference measurement resource to the UE. The eNB may configure, as the control interference measurement resource, a part of RE(s), REG(s), or PRB(s) in which zero-power transmission according to the present invention is performed among resources in a control region. The UE may demodulate a corresponding control channel by estimating a channel state of the control channel using the control interference measurement resource. The UE may derive channel state information for the control channel using the control interference measurement resource. For example, the UE may measure an interference value of the control channel using the control interference measurement resource and derive the channel state information for the control channel based on the measured interference value. The UE may report the channel state information to the eNB. The eNB may configure an interference measurement resource for a data region in which data channel(s) are transmitted (hereinafter, a data interference measurement resource) and provide information about the data interference measurement resource to the UE. The UE may demodulate a corresponding data channel by estimating a channel state of the data channel using the data interference measurement resource. The UE may derive channel state information for the data channel using the data interference measurement resource. For example, the UE may measure an interference value of the data channel using the data interference measurement resource and derive the channel state information for the data channel based on the measured interference value. The UE may report the channel state information to the eNB.

In the present invention, the resources on which zero-power transmission is performed may be limited to a resource region of OFDM symbol(s) in which the PDCCH is transmitted. In the present invention, in a subframe/TTI in which the PDCCH is not transmitted and only the PDSCH is transmitted, zero-power transmission according to the present invention may not be performed.

In the present invention, a resource region in which zero-power transmission is performed may be valid for transmission of a URLLC channel but may not be used for transmission of an eMBB channe.

A portion/ratio of the resource region in which zero-power transmission is performed may dynamically or semi-statically vary. The ratio between zero-power transmission REs and nonzero-power transmission REs, i.e., the ratio between the amount of zero-power transmission resources and the amount of nonzero-power transmission resources, and an applied rule may be configured for the UE. For example, if the ratio of the zero-power transmission REs to the nonzero-power transmission REs is configured as 3 to 1, this may imply that the ratio of the number of zero-power REs to the number of nonzero-power REs is 3 to 1 and power that should have been used for the zero-power REs under the assumption that power boosting according to the present invention is not performed is used for the nonzero-power REs. The ratio of zero-power transmission REs to nonzero-power transmission REs may be represented by a power boosting degree for transmission REs. For example, the ratio of power of an RE when the eNB does not perform zero-power transmission to power of a nonzero-power RE which is boosted by zero-power transmission by the eNB may be provided to the UE as information about zero-power transmission. A method of configuring zero-power REs may conform to methods which will be described below. Generally, configuring zero-power REs at a PRB level, an REG level, a CCE level, or an RE level may be considered. Information about the ratio of zero-power REs to nonzero-power REs (i.e., power REs), a configuration scheme of zero-power REs, and a start offset at which power REs are transmitted may be preconfigured for the UE by a network or an eNB through higher layer signaling or may be dynamically changed by the network or the eNB. If zero-power REs of the RE level are configured, the zero-power REs may be configured in consideration of locations of DM-RSs (hereinafter, DM-RS REs). According to the present invention, the eNB may configure a part of REs constituting a PDCCH candidate as zero-power REs and boost power of the remaining REs for transmission.

In the present invention, a resource region in which the eNB performs zero-power transmission may be determined as follows.

Zero-Power Transmission at Some Frequency Resource Locations

Zero-power transmission may be performed at a determined frequency resource location. Frequency resources on which zero-power transmission is performed may be equal to resources of some PRB(s) or some RE(s) within system bandwidth.

For example, the PDCCH may not be transmitted and zero-power transmission may be performed in odd-numbered or even-numbered PRB regions within an OFDM symbol.

Alternatively, the PDCCH may not be transmitted and zero-power transmission may be performed on some RE(s) in each PRB within an entire PRB region or a specific PRB region. A resource region in which zero-power transmission is performed may not be included in an RE region constituting an REG in which the PDCCH is transmitted. That is, the, REG may include remaining REs except for REs on which zero-power transmission is performed. Alternatively, REs on which zero-power transmission is performed may be included in REs constituting the REG but RE(s) on which zero-power transmission is performed may be punctured or rate-matched without being used for actual transmission of the PDCCH. Alternatively, the size of the REG, the size of a CCE, or an aggregation level may be changed in consideration of a zero-power region.

The PDCCH may be rate-matched or punctured on resources on which zero-power transmission is performed. When a resource on which zero-power transmission is performed overlaps with a resource used for transmission of the PDSCH, transmission of the PDSCH may be rate-matched or punctured. Even though a UE-specific or group-specific RS for demodulating the PDCCH and/or the PDSCH is scheduled to be transmitted in a zero-power resource region, transmission of the RS may be rate-matched or punctured.

A resource on which zero-power transmission of the present invention is performed may be cell-specifically or UE-specifically configured or determined.

Zero-Power Transmission on Some REG/CCE Resources

The PDCCH may not be transmitted and zero-power transmission may be performed in some REGs/CCEs. For example, the PDCCH may not be transmitted and zero-power transmission may be performed in odd-numbered or even-numbered REGs/CCEs. The PDCCH may be rate-matched or punctured in an REG/CCE in which zero-power transmission is performed. When the REG/CCE in which zero-power transmission is performed overlaps with a transmission resource of the PDSCH, transmission of the PDSCH may be rate-matched or punctured.

When REG(s) in which zero-power transmission is performed are configured in a control channel transmission region, the REG(s) may be excluded from REG resources constituting the CCE of the PDCCH. That is, the CCE may include REGs except for the REG(s) in which zero-power transmission is performed. Alternatively, an REG region in which the PDCCH is not transmitted and zero-power transmission is performed may be included in REG resources constituting the CCE of the PDCCH but transmission of the PDCCH may be rate-matched or punctured on the corresponding REG resources when the PDCCH is actually transmitted.

When CCE(s) in which zero-power transmission is performed in the control channel transmission region are configured, the CCE(s) may be excluded from CCE resources constituting decoding candidates of the PDCCH, i.e., PDCCH candidates. That is, the decoding candidates of the PDCCH may include CCE(s) except for the CCE(s) in which zero-power transmission is performed. Alternatively, the CCE in which zero-power transmission is performed (hereinafter, zero-power CCE) in the control channel transmission region may be included in the CCE resources constituting the decoding candidates of the PDCCH but transmission of the PDCCH may be rate-matched or punctured in the zero-power CCE when the PDCCH is actually transmitted.

REG(s)/CCE(s) in which the PDCCH signal is not transmitted and zero-power transmission is performed may be cell-specifically or UE-specifically configured or determined.

If the UE is aware of the ratio of zero-power REs configured by the eNB for the UE to power REs, i.e., the ratio of the number of zero-power REs to the number of nonzero-power REs, the UE may consider configuration of an REG or a CCE using the ratio. For example, if the number of REs constituting the REG is m when the ratio of zero-power REs to power REs is 0 to 1, this may imply that the number of REs constituting the REG when the ratio of zero-power REs to power REs is k:1 increases to m*(k+1) which is the sum of the number of zero-power REs, m*k, and the number of power REs, m. According to the REG configured in the above way, the CCE may be configured. As another example, if one CCE includes p REGs when zero-power REs are not present, this may imply that one CCE includes p*(k+1) REGs when the ratio of zero-power REs to power REs is k to 1. If the ratio of zero-power REs to power REs or a value of k differs according to each UE, a search space may be differently configured for each UE. If the search space is differently configured for each UE, this may complicate multiplexing. k may be limited to a value of making m*(k+1) or p*(k+1) an integer. Upon configuring the ratio of zero-power REs to power REs or the value of k, RE(s) on which power is carried may be configured as an RE level (for an REG option) or an REG or RE level (for a CCE operation). In addition, the eNB and the UE may assume that a start RE or REG offset is configured for the UE or the UE may discern the offset through blind detection. The present invention may also be applied when the CCE is defined without any REG.

In the case of a UE-specific or group-specific RS transmitted within RE resources or PRB resources including the REG/CCE in which zero-power transmission is performed, transmission of the RS may be rate-matched or punctured. Alternatively, when a UE-specific or group-specific RS is defined and transmitted in one PRB but the REG/CCE is configured as some resources in one PRB, zero-power transmission is not performed and the RS may be transmitted at a UE-specific or group-specific RS location transmitted in a PRB including the REG/CCE in which zero-power transmission is performed by taking into consideration usage of the RS for transmission of another REG/CCE in the PRB. Upon considering the case in which the UE-specific or group-specific RS is defined and transmitted in multiple PRBs, zero-power transmission is not performed and the RS may be transmitted at a UE-specific or group-specific RS location in a PRB group including the REG/CCE in which zero-power transmission is performed. Alternatively, assuming that different PDCCHs multiplexed in the same PRB or same PRB group are transmitted through different antenna ports, only a UE-specific or group-specific RS, which is transmitted in an RE, a PRB, or a PRB group including the REG/CCE in which zero-power transmission is performed and is transmitted through an antenna port through which the PDCCH is transmitted, may be rate-matched or punctured. In this case, UE-specific or group-specific RSs for the other antenna ports may be transmitted (without being rate-matched or punctured).

Zero-Power Transmission on Some Decoding Candidate Resources

The PDCCH is not transmitted and zero-power transmission may be performed on some decoding candidate resources. For example, the PDCCH is not transmitted and zero-power transmission may be performed in odd-numbered or even-numbered decoding candidates. When a decoding candidate resource on which zero-power transmission is performed overlaps with a PDCCH transmission resource, transmission of the PDCCH may be rate-matched or punctured.

The UE may not monitor the PDCCH in a decoding candidate in which the PDCCH is not transmitted and zero-power transmission is performed.

A decoding candidate resource region in which the PDCCH is not transmitted and zero-power transmission is performed may be cell-specifically or UE-specifically configured or determined.

Zero-Power Transmission on Some RE Resources in REG/CCE

The PDCCH is not transmitted and zero-power transmission may be performed on some RE resources, i.e., some RE(s), in each REG/CCE. For example, the PDCCH is not transmitted and zero-power transmission may be performed on specific N/2 or N/3 REs among N REs constituting the REG/CCE. The PDCCH may be rate-matched or punctured on an RE on which zero-power transmission is performed. When an RE on which zero-power transmission is performed overlaps with a PDSCH transmission resource, transmission of the PDCCH may be rate-matched or punctured.

An RE resource location in the REG/CCE in which the PDCCH is not transmitted and zero-power transmission is performed may be cell-specifically or UE-specifically configured or determined.

If the UE is aware of the ratio of zero-power REs to power REs in the REG configured therefor, the UE may consider configuration of the REG or the CCE using the ratio. For example, if the number of REs constituting the REG is m when the ratio of zero-power REs to power REs is 0 to 1, this may imply that the number of REs constituting the REG when the ratio of zero-power REs to power REs is k:1 increases to m*(k+1). According to the REG configured in the above way, the CCE may be configured. As another example, if one CCE includes p REGs when zero-power REs are not present, this may imply that one CCE may include p*(k+1) REGs when the ratio of zero-power REs to power REs is k to 1. If the ratio of zero-power REs to power REs or a value of k differ according to each UE, a search space may be differently configured for each UE. If the search space is differently configured for each UE, this may complicate multiplexing. k may be limited to a value making m*(k+1) or p*(k+1) an integer. Upon configuring the ratio of zero-power REs to power REs or the value of k, RE(s) on which power is carried may be configured as an RE level (for an REG operation) or an REG or RE level (for a CCE option). In addition, the eNB and the UE may assume that a start RE or REG offset is configured for the UE or the UE may discern the offset through blind detection. The present invention may also be applied when the CCE is defined without any REG.

When zero-power transmission is performed, transmission of a UE-specific or group-specific RS used to demodulate the PDCCH/PDSCH may be as follows.

Even though a UE-specific or group-specific RS for demodulating the PDCCH and/or the PDSCH is scheduled to be transmitted in a zero-power transmission region, transmission of the RS may be rate-matched or punctured and zero-power transmission may be performed.

When a resource on which zero-power transmission is performed is determined in units of a decoding candidate, in the case of a UE-specific or group-specific RS transmitted within RE, REG, CCE, or PRB resources in which a decoding candidate in which zero-power transmission is performed is transmitted, transmission of the RS may be rate-matched or punctured and zero-power transmission may be performed.

Figure 9:
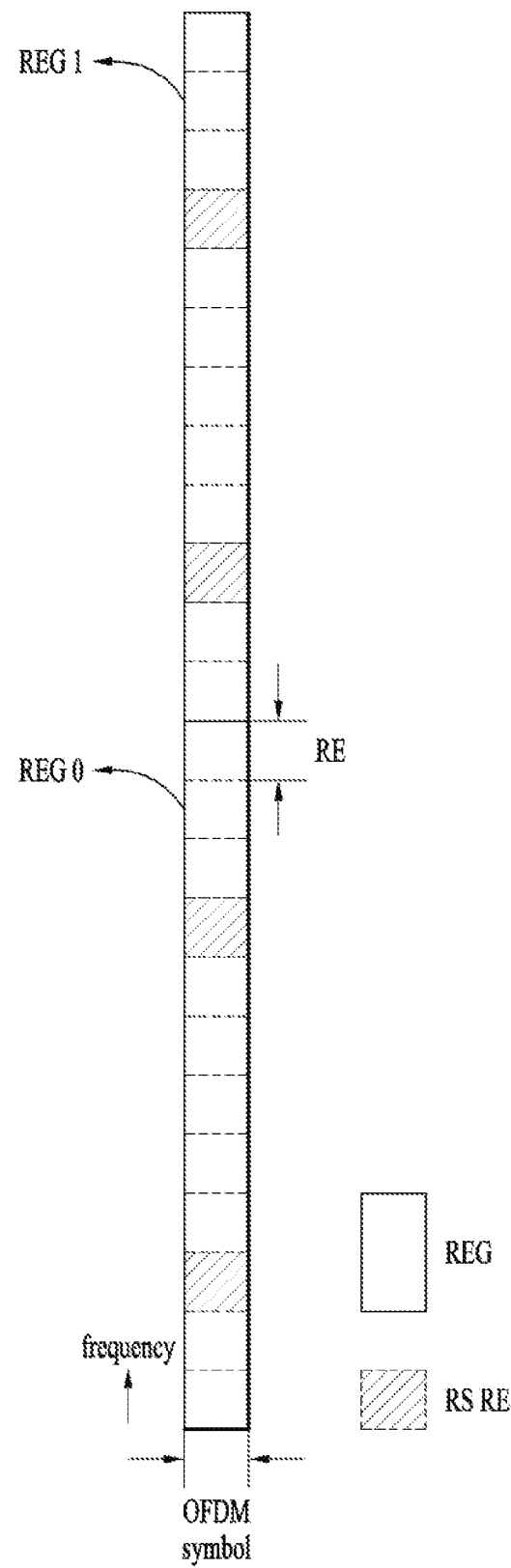
FIG. 9 is another example of performing zero-power transmission on a part of control channel resources according to the present invention.

When a resource on which zero-power transmission is performed is determined in units of an REG/CCE, in the case of a UE-specific or group-specific RS transmitted within RE resources including the REG/CCE in which zero-power transmission is performed, transmission of the RS may be rate-matched or punctured. Alternatively, in the case of a UE-specific or group-specific RS transmitted within PRB resources including the REG/CCE in which zero-power transmission is performed, transmission of the RS may be rate-matched or punctured. FIG. 9 is another example of performing zero-power transmission on a part of control channel resources according to the present invention. For example, when REGs are configured as illustrated in FIG. 9 and an RS for demodulating a corresponding REG in each REG is present, transmission of the RS is rate-matched or punctured in an REG in which zero-power transmission is performed and zero-power transmission may be performed at the location of the RS.

Although the UE-specific or group-specific RS may be defined and transmitted in the unit of one PRB or PRB group, the REG/CCE may be configured as some resources in one PRB or PRB group. In this case, the RS may also be used to receive another REG/CCE in the PRB or PRB group. In consideration of the above case, zero-power transmission is not performed and the RS may be transmitted at a UE-specific or group-specific RS location in a PRB or PRB group including the REG/CCE in which zero-power transmission is performed.

Alternatively, assuming that different PDCCHs multiplexed in the same PRB or same PRB group are transmitted through different antenna ports, only a UE-specific or group-specific RS transmitted through an antenna port through which the PDCCH is transmitted among UE-specific or group-specific RSs transmitted in a PRB or PRB group in which the REG/CCE is transmitted may be rate-matched or punctured. In this case, the UE-specific or group-specific RSs for the other antenna ports may be transmitted (without being rate-matched or punctured).

<B. ICIC of PDCCH>

Due to interference from PDCCHs transmitted by different cells, the performance of the PDCCHs may be reduced. Accordingly, for interference coordination between inter-cell PDCCHs, resources on which the PDCCHs are transmitted or zero-power transmission resource locations proposed in Section A may be differently configured between cells.

Figure 10:
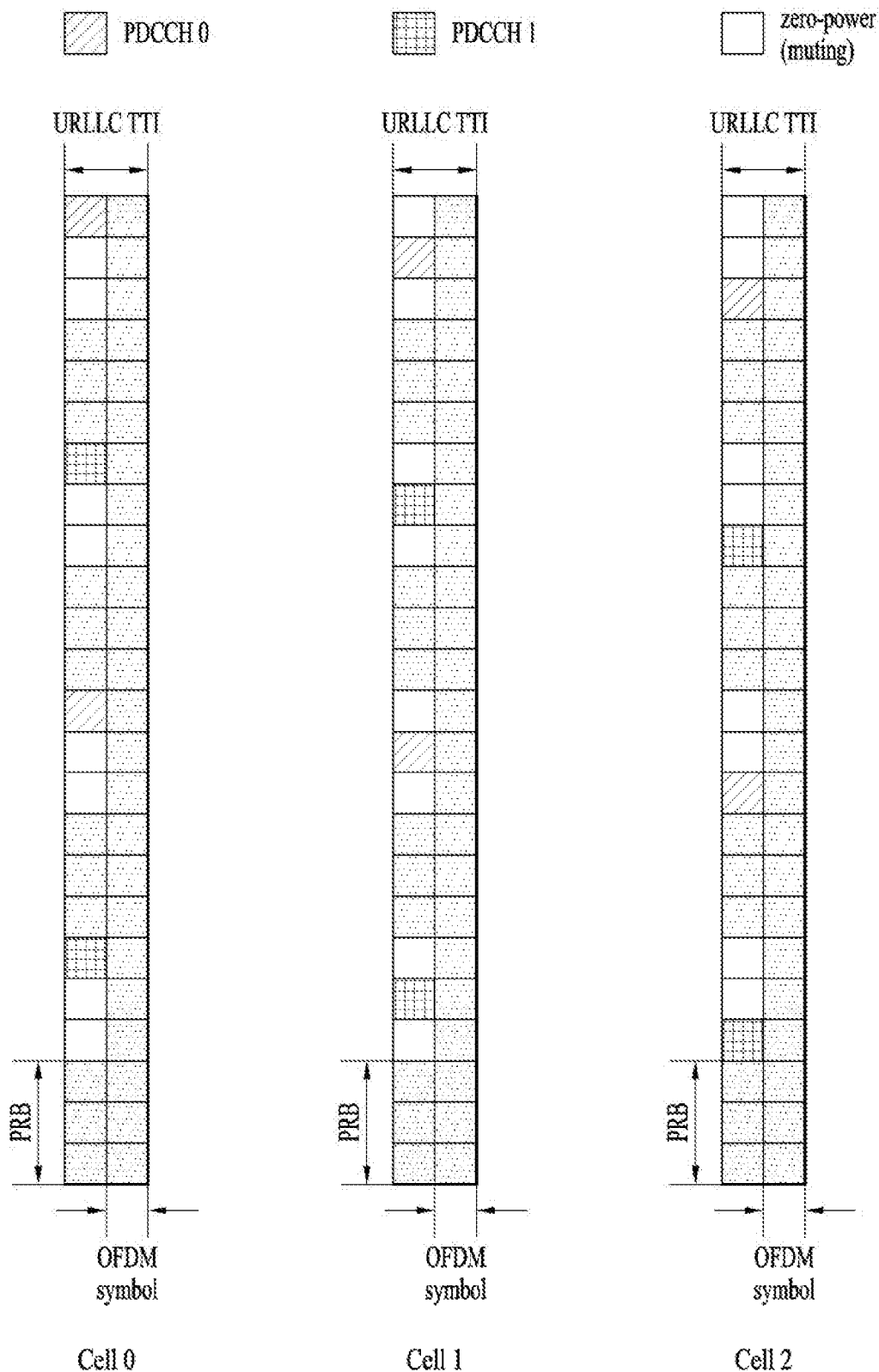
FIG. 10 is another example of performing zero-power transmission on a part of control channel resources according to the present invention.

FIG. 10 is another example of performing zero-power transmission on a part of control channel resources according to the present invention.

For example, as illustrated in FIG. 10, a zero-power transmission (i.e., muting) resource location may differ according to each cell. In this case, the PDCCH is not transmitted at the zero-power transmission resource location. Herein, interference from another cell is not affected in a resource region in which the PDCCH is transmitted and the transmission performance and reliability of the PDCCH may be raised.

Figure 11:
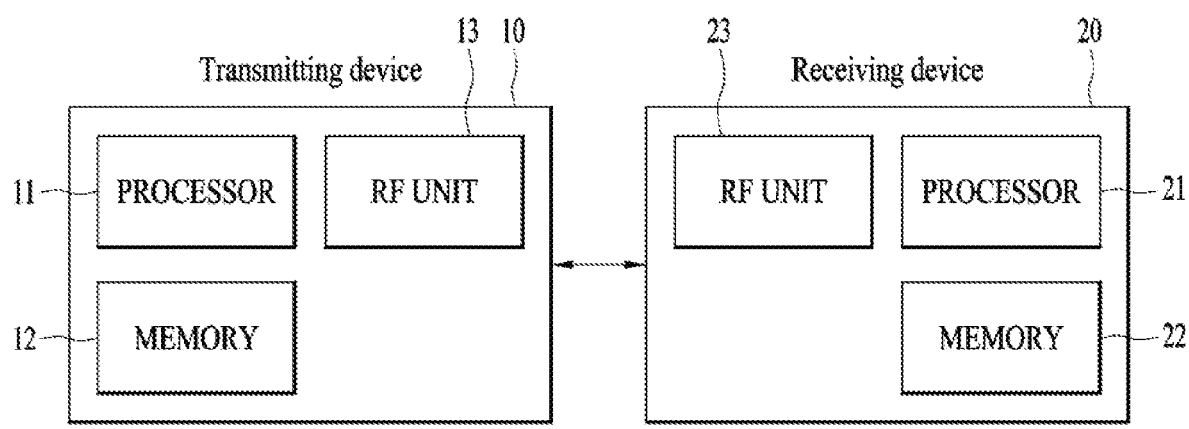
FIG. 11 is a block diagram illustrating elements of a transmitting device 10 and a receiving device 20 for implementing the present invention.

FIG. 11 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described examples of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the examples of the present invention, a UE operates as the transmitting device 10 in UL and as the receiving device 20 in DL. In the examples of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor may perform zero-power transmission in a control region according to the present invention. The eNB processor may control the eNB RF unit to transmit zero-power configuration information about zero-power transmission that the eNB processor is to perform to the UE. The zero-power configuration information may be the ratio between the amount of zero-power resources and the amount of nonzero-power resources among the DL control channel candidates, or the ratio between transmission power of the nonzero-power resources when zero-power resources are not present in the DL control channel candidates and transmission power of the nonzero-power resources when the zero-power resources are present in the DL control channel candidates. The eNB processor may perform zero-power transmission in a part of the channel decoding candidates, some PRB(s) in the control region, some REG(s) of the control channel decoding candidates, some CCE(s) of the control channel decoding candidates, or some RE(s) of the control channel decoding candidates according to the zero-power configuration information. The eNB processor may boost the transmission power of the nonzero-power resources using transmission power that could be added to the zero-power resources. The eNB processor may set some resources of the control channel candidates to have zero-power according to the zero-power configuration information and control the eNB RF unit to transmit a corresponding control channel at boosted power on the other nonzero-power resources. The UE processor may control the UE RF unit to receive the zero-power configuration information. The UE processor may detect the control channel in the control channel candidates based on the zero-power configuration information. For example, the UE processor may regard a part of the control channel candidates as having zero power based on the zero-power configuration information and decode or detect the control channel on the other nonzero-power resources.

The eNB processor may configure an interference measurement resource for a control region or for a control channel which is to be transmitted in the control region (hereinafter, a control interference measurement resource) and control the eNB RF unit to transmit corresponding configuration information to the UE. The UE processor may control the UE RF unit to receive the configuration information. The UE processor may estimate a channel state of the control region or a channel state of a control channel transmitted in the control region using the control interference measurement resource and demodulate or decode the control channel based on the estimated channel state. The UE processor may derive channel state information of the control region or channel state information of the control channel using the control interference measurement resource. The UE processor may control the UE RF unit to transmit the channel state information to the eNB. The eNB processor may control the eNB RF unit to receive the measured channel state information using the control interference measurement resource from the UE. The eNB processor may configure an interference measurement resource for a data region or for a data channel which is to be transmitted in the data region (hereinafter, a data interference measurement resource) and control the eNB RF unit to transmit corresponding configuration information to the UE. The UE processor may control the UE RF unit to receive the configuration information. The UE processor may estimate a channel state of the data region or a channel state of the data channel transmitted in the data region using the data interference measurement resource and demodulate or decode the data channel based on the estimated channel state. The UE processor may derive channel state information of the data region or channel state information of the data channel using the data interference measurement resource. The UE processor may control the UE RF unit to transmit the channel state information to the eNB. The eNB processor may control the eNB RF unit to receive the measured channel state information from the UE using the data interference measurement resource.

As described above, the detailed description of the preferred examples of the present invention has been given to enable those skilled in the art to implement and practice the invention. Although the invention has been described with reference to examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The examples of the present invention are applicable to a BS, a UE, or other devices in a wireless communication system.

The invention claimed is:

1. A method of receiving a downlink (DL) signal by a user equipment in a wireless communication system, the method comprising:
   receiving zero-power information about a DL control channel,
   wherein the zero-power information is information indicating a ratio between transmission power of non-zero-power resources on the assumption that zero-power resources are not present in DL control channel candidates and transmission power of the non-zero-power resources on the assumption that the zero-power resources are present in the DL control channel candidates;
   determining the DL control channel candidates in a slot based on the zero-power information, the DL control channel candidates comprising the non-zero-power resources and the zero-power resources; and
   receiving the DL control channel by monitoring the non-zero-power resources of the DL control channel candidates in the slot.

2. The method of claim 1,
   wherein the slot is divided into a control region and a data region in a time domain, and the method further comprises:
   receiving first interference measurement resource information indicating a first interference measurement resource in the control region; and
   acquiring first channel state information on the DL control channel using the first interference measurement resource.

3. The method of claim 2, further comprising:
   receiving second interference measurement resource information indicating a second interference measurement resource in the data region; and
   acquiring second channel state information on a data channel transmitted in the data region using the second interference measurement resource.

4. A user equipment for receiving a downlink (DL) signal in a wireless communication system, the user equipment comprising,
  a radio frequency (RF) unit, and
  a processor configured to control the RF unit,
  wherein the processor is configured to:
  control the RF unit to receive zero-power information about a DL control channel,
  wherein the zero-power information is information indicating a ratio between transmission power of non-zero-power resources on the assumption that zero-power resources are not present in DL control channel candidates and transmission power of the non-zero-power resources on the assumption that the zero-power resources are present in the DL control channel candidates;
  determine the DL control channel candidates in a slot based on the zero-power information, the DL control channel candidates comprising the non-zero-power resources and the zero-power resources; and
  control the RF unit to receive the DL control channel by monitoring the non-zero-power resources of the DL control channel candidates in the slot.

5. The user equipment of claim 4,
  wherein the slot is divided into a control region and a data region in a time domain, and the processor is configured to:
  control the RF unit to receive first interference measurement resource information indicating a first interference measurement resource in the control region; and
  acquire first channel state information on the DL control channel using the first interference measurement resource.

6. The user equipment of claim 5, wherein the processor is configured to:
  control the RF unit to receive second interference measurement resource information indicating a second interference measurement resource in the data region; and
  acquire second channel state information on a data channel transmitted in the data region using the second interference measurement resource.

* * * * *